United States Patent Office 3,766,200
Patented Oct. 16, 1973

3,766,200
CERTAIN DIAZOLYLALIPHATIC ESTERS OF THIO-
PHOSPHORIC AND DITHIOPHOSPHORIC ACIDS
Kurt Rüfenacht, Basel, Switzerland, assignor to Ciba-
Geigy Corporation, Ardsley, N.Y.
No Drawing. Filed June 29, 1971, Ser. No. 158,081
Int. Cl. C07d 91/62
U.S. Cl. 260—302 E                37 Claims

ABSTRACT OF THE DISCLOSURE

New organic phosphorus compounds, process for their production and use in pest control are disclosed. The compounds are thia- or oxadiazolonyl-dithiophosphates of the formula

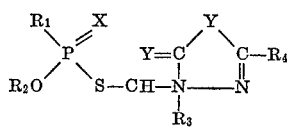

wherein $R_1$ represents lower alkyl, lower alkoxy or phenyl, $R_2$ is lower alkyl, $R_3$ is lower alkyl, lower halogenoalkyl, lower alkoxyalkyl, lower alkylthioalkyl or phenyl, $R_4$ is hydrogen, lower alkyl, lower alkoxy, lower alkylthio, alkoxy-alkyl, alkylthioalkyl or phenyl and X, Y and Z each is oxygen or sulphur.

---

The present invention relates to new organic phosphorus compounds, to processes for the production thereof, and to the use of these compounds for the control of pests on animals and on plants.

The new organic phosphorus compounds correspond to the Formula I:

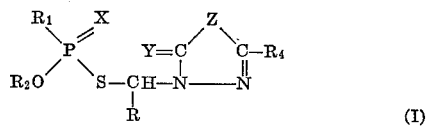   (I)

the symbols in this formula have the following meanings:

$R_1$ represents lower alkyl, lower alkoxy or phenyl,
$R_2$ represents lower alkyl,
$R_3$ represents lower alkyl, lower halogenoalkyl, lower alkoxyalkyl, lower alkylthioalkyl, phenyl,
$R_4$ represents hydrogen, lower alkyl, lower alkoxy, lower alkylthio, alkoxyalkyl, alkylthioalkyl, phenyl, and the symbols X, Y and Z represents, independently of each other, oxygen or sulphur.

By a lower alkyl radical, represented in Formula I by the symbols $R_1$, $R_2$, $R_3$ and $R_4$, are meant straight chain or branched radicals having 1 to 6 carbon atoms, preferably 1 to 4 carbon atoms. Examples of these are: methyl, ethyl, n-propyl, isopropyl, n-butyl, sec-butyl, tert-butyl, isobutyl, also pentyl and hexyl radicals. These radicals also apply for the alkyl part or parts of an alkoxy, alkylthio, halogenoalkyl, alkoxyalkyl or alkylthioalkyl radical. Halogen in an halogenoalkyl radical is preferably chlorine or bromine.

Of particular importance are compounds of the formula:

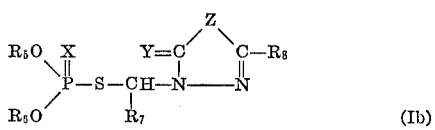   (Ib)

wherein $R_5$ and $R_6$ each represent methyl or ethyl; $R_7$ represents methyl, ethyl, $C_3H_7$, chloromethyl, bromomethyl, $-CH_2OCH_3$, $-CH_2SCH_3$, $-CH_2SC_2H_5$, $-CH_2SC_3H_7(i)$ or phenyl; $R_8$ represents hydrogen, methyl, methoxy, ethoxy, iso-propoxy, methylthio or phenyl; and X, Y and Z each represent oxygen or sulphur.

The new organic phosphorus compounds of Formula I are produced according to the present invention by the simultaneous condensation of a phosphorus compound of the formula:

   (II)

as such or in the form of one of its salts, with an aldehyde of the formula:

$$R_3\text{—CHO} \qquad (III),$$

or with a reactive derivative of such an aldehyde, and with a diazole derivative of the formula:

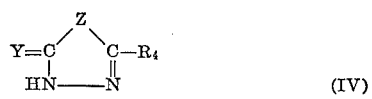   (IV)

the simultaneous condensation being performed in the aqueous solution of strong mineral acids having no oxidising action under the reaction conditions. In Formulae II to IV, $R_1$ to $R_4$, X, Y and Z have the meanings given under Formula I.

By simultaneous condensation is meant in the present case that the aldehyde component of Formula III is, on the one hand, simultaneously brought into contact with the phosphorus compound of Formula II and, on the other hand, with the diazole component of Formula IV. This is achieved by the aldehyde component preferably being added to the mixture of aqueous mineral acid, phosphorus compound and diazole. It is however also possible to add the mixture of phosphorus compound and diazole to the mixture of aldehyde component and aqueous mineral acid. This procedure enables undesirable secondary reactions to be avoided, such as the linkage of an aldehyde molecule either with two phosphorus radicals or with two diazole radicals. The reaction temperatures are in the range of 15° to 60°, preferably 20° to 45°.

As strong mineral acids having no oxidising action under the reaction conditions are preferred for the process according to the invention the following acids: sulphuric acid, hydrochloric acid, hydrobromic acid, as well as mixtures of such acids. In the form of their aqueous solutions they serve as solvent and as condensation agent. For the condensation reaction are preferably used: 60–98%, preferably 70–90%, sulphuric acid, 20–45%, preferably 25–40%, hydrochloric acid, and 40–65%, preferably 45–55% hydrobromic acid. The concentration of the mineral acid is decisive for the occurrence of the condensation reaction, and hence for the attainment of the optimum yield. In contrast to the concentration, the volume of mineral acid used is not critical. The mineral acid must, however, always be used in such a volume that the mechanical miscibility of the reaction mixture is ensured. With the use of salts of the phosphorus compounds of Formula II or aldehyde derivatives, which, by the consumption of acid or by dilution, displace the acid concentration, the volume of aqueous mineral acid must be so chosen that the acid concentration does not fall below the above stated limits.

With regard to the phosphorus compounds of Formula II serving as starting materials for the process according to the invention, these are thiophosphoric acids or thiophosphonic acids. These are used in the reaction in the free form, or in the form of their salts, preferably in the form of their alkali metal salts or ammonium salts. The acids are liberated from the salts by the mineral acid. Usable as thiophosphoric acids and thiophosphonic acids of Formula II for the process according to the invention are, for example, the following:

O,O-dimethyl-thiophosphoric acid,
O,O-dimethyl-dithiophosphoric acid,
O,O-diethyl-thiophosphoric acid,
O,O-diethyl-dithiophosphoric acid,
O-methyl-O-ethyl-thiophosphoric acid,
O-methyl-O-ethyl-dithiophosphoric acid,
O-methyl-O-isopropyl-dithiophosphoric acid,
O,O-di-isopropyl-dithiophosphoric acid,
O-methyl-dithio-methylphosphonic acid,
O-ethyl-dithio-methylphosphonic acid,
O-methyl-dithio-ethylphosphonic acid,
O-ethyl-dithio-ethylphosphonic acid,
O-methyl-dithio-phenylphosphonic acid,
O-ethyl-dithio-phenylphosphonic acid.

For the process according to the invention, the aldehydes can be used in the free form, in the form of their acetals, or in the form of oligomers and polymers. As acetals are preferred the dimethylacetals, the acetals, oligomers and polymers are cleaved by the strong aqueous mineral acid to produce the free aldehydes. It is moreover possible to use aqueous solutions of aldehydes, provided that by suitable measures, e.g. by the introduction of hydrochloric acid gas, the hereby occurring dilution of the reaction medium is compensated for, and hence a decrease of the mineral acid concentration avoided.

As aldehydes of Formula III, the following are, for example, usable for the process according to the invention:

acetaldehyde,
chloroacetaldehyde,
dichloroacetaldehyde,
trichloroacetaldehyde,
bromoacetaldehyde,
methoxyacetaldehyde,
ethoxyacetaldehyde,
propoxyacetaldehyde,
isopropoxyacetaldehyde,
methylthioacetaldehyde,
ethylthioacetaldehyde,
propylthioacetaldehyde,
isopropylthioacetaldehyde,
propionaldehyde,
3-chloropropionaldehyde,
3-methoxypropionaldehyde,
3-ethoxypropionaldehyde,
3-methylthiopropionaldehyde,
butyraldehyde,
3-methoxybutyraldehyde,
isobutyraldehyde,
benzaldehyde.

Applicable as diazole derivatives of Formula IV are 1,3,4-oxadiazol-5(4H)-ones or 1,3,4-oxadiazole-5(4H)-thiones, and 1,3,4-thiadiazol-5(4H)-ones or 1,3,4-thiadiazole-5(4H)-thiones; the following are preferred:

1,3,4-oxadiazol-5(4H)-one,
2-methyl-1,3,4-oxadiazol-5(4H)-one,
2-ethyl-1,3,4-oxadiazol-5(4H)-one,
2-propyl-1,3,4-oxadiazol-5(4H)-one,
2-isopropyl-1,3,4-oxadiazol-5(4H)-one,
2-methoxymethyl-1,3,4-oxadiazol-5(4H)-one,
2-methyl-thiomethyl-1,3,4-oxadiazol-5(4H)-one,
2-phenyl-1,3,4-oxadiazol-5(4H)-one,
2-methyl-1,3,4-oxadiazol-5(4H)-thione,
2-ethyl-1,3,4-oxadiazole-5(4H)-thione,
2-propyl-1,3,4-oxadiazole-5(4H)-thione,
2-isopropyl-1,3,4-oxadiazole-5(4H)-thione,
2-phenyl-1,3,4-oxadiazole-5(4H)-thione,
2-methoxy-1,3,4-thiadiazol-5(4H)-one,
2-ethoxy-1,3,4-thiadiazol-5(4H)-one,
2-propoxy-1,3,4-thiadiazol-5(4H)-one,
2-isopropoxy-1,3,4-thiadiazol-5(4H)-one,
2-methoxy-1,3,4-thiadiazole-5(4H)-thione,
2-ethoxy-1,3,4-thiadiazole-5(4H)-thione,
2-isopropoxy-1,3,4-thiadiazole-5(4H)-thione,
2-methylthio-1,3,4-thiadiazol-5(4H)-one,
2-ethylthio-1,3,4-thiadiazol-5(4H)-one,
2-isopropylthio-1,3,4-thiadiazol-5(4H)-one,
2-methylthio-1,3,4-thiadiazole-5(4H)-thione.

The new organic phosphorus compounds of Formula Ia:

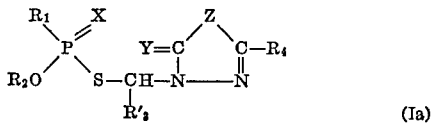

(Ia)

wherein $R_3'$ represents the chloromethyl radical or the methyl radical are obtained also by a modified process whereby a diazole compound of Formula V:

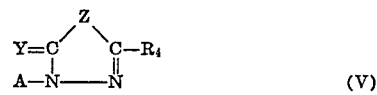

(V)

wherein A represents a 1-halogenoethyl radical or a 1-halogen-2-chloroethyl radical is reacted with a phosphorus compound of Formula II in the presence of an acid-binding agent, or with a salt of such a phosphorus compound. The symbols $R_1$, $R_2$, $R_4$, X, Y and Z in Formulae Ia and V have the meanings given under Formula I.

In the reaction of a diazole derivative of Formula V with a phosphorus compound of Formula II, the halogen atom in 1-position is exchanged. Either an acid-binding agent is therefore used or salts are used, especially the alkali metal and ammonium salts of phosphorus compounds of Formula II. As acid-binding agents are preferred the alkali metal hydroxides and alkali metal carbonates; it is also possible, however, to use nitrogen bases, such as tertiary amines. The phosphorus compounds of Formula II react with the diazole derivatives of Formula V without further difficulties at temperatures of between 0 and 100°, preferably at 10 to 70° C. It is advisable to perform the reaction in the presence of a solvent or diluent inert to the reactants. Applicable in the first place are lower aliphatic ketones such as acetone, methyl ethyl ketone, alkanols such as methanol, ethanol, isopropanol, esters such as ethyl acetate, nitriles, N-alkylated acid amides, aromatic hydrocarbons such as benzene, toluene, and water, as well as mixtures of such solvents with water.

The starting materials of Formula V have not been known hitherto. They are obtained by reaction of a diazole of Formula VI:

(VI)

with acetaldehyde or chloroacetaldehyde and a subsequent, preferably however a simultaneous, treatment with a halogenation agent such as thionyl chloride, phosphorus trichloride, phosphorus tribromide, phosphorus oxychloride, phosphorus pentachloride, $R_4$ and Y in Formula VI have the meanings given under Formula I.

These reactions are performed in a solvent or diluent inert to the reactants. Most suitable for the preferred method of carrying out the invention are halogenated hydrocarbons such as chloroform, halogenated ethanes, carbon tetrachloride. It is also possible to use, however, aromatic hydrocarbons such as benzene, chlorobenzene, etc. Where the procedure is performed in stages, the 1st stage can be carried out in organic solvents and in aqueous solution; for the halogenation stage (2nd stage) are then used the above stated halogenated hydrocarbons. The reaction temperatures are in the range of 0°–100° C., preferably from 20° to 70° C.

Applicable as diazole derivatives of Formula V are 1,3,4-oxadiazol-(5(4H)-ones or 1,3,4-oxadiazole-5(4H)-thiones and 1,3,4-thiadiazol-5(4H)-ones or 1,3,4-thiadiazole-5(4H)-thiones, e.g. the following:

4-(1'-chloroethyl)-1,3,4-oxadiazol-5(4H)-one,
4-(1'-bromoethyl(1,3,4-oxadiazol-5(4H)-one,
4-(1',2'-dichloroethyl)-1,3,4-oxadiazol-5(4H)-one,
4-(1'-bromo-2'-chloroethyl)-1,3,4-oxadiazol-5(4H)-one,
4-(1'-chloroethyl)-2-methyl-1,3,4-oxadiazol-5(4H)-one,
4-(1'-bromoethyl)-2-methyl-1,3,4-oxadiazol-5(4H)-one,
4-(1',2'-dichloroethyl)-2-methyl-1,3,4-oxadiazol-5(4H)-one,
4-(1'-bromo-2'-chloroethyl)-2-methyl-1,3,4-oxadiazol-5(4H)-one,
4-(1'-chloroethyl)-2-methoxy-1,3,4-thiadiazol-5(4H)-one,
4-(1'-bromoethyl)-2-methoxy-1,3,4-thiadiazol-5(4H)-one,
4-(1',2'-dichloroethyl)-2-methoxy-1,3,4-thiadiazol-5(4H)-one,
4-(1'-bromo-2'-chloroethyl)-2-methoxy-1,3,4-thiadiazol-5(4H)-one,
4-(1'-chloroethyl)-2-ethoxy-1,3,4-thiadiazol-5(4H)-one,
4-(1'-bromoethyl)-2-ethoxy-1,3,4-thiadiazol-5(4H)-one,
4-(1',2'-dichloroethyl)-2-ethoxy-1,3,4-thiadiazol-5(4H)-one,
4-(1'-bromo-2'-chloroethyl)-2-ethoxy-1,3,4-thiadiazol-5(4H)-one,
4-(1'-chloroethyl)-2-isopropxy-1,3,4-thiadiazol-5(4H)-one,
4-(1'-bromoethyl)-2-isopropoxy-1,3,4-thiadiazol-5(4H)-one,
4-(1',2'-dichloroethyl)-2-isopropxy-1,3,4-thiadiazol-5(4H)-one,
4-(1'-bromo-2'-chloroethyl)-2-isopropxy-1,3,4-thiadiazol-5(4H)-one,
4-(1'-chloroethyl)-2-methylthio-1,3,4-thiadiazol-5(4H)-one,
4-(1'-bromoethyl)-2-methylthio-1,3,4-thiadiazol-5(4H)-one,
4-(1',2'-dichloroethyl)-2-methyl-1,3,4-thiadiazol-5(4H)-one,
4-(1'-bromo-2'-chloroethyl)-2-methylthio-1,3,4-thiadiazol-5(4H)-one,
4-(1'-chloroethyl)-2-methovy-1,3,4-thiadiazole-5(4H)-thione,
4-(1'-bromoethyl)-2-methoxy-1,3,4-thiadiazole-5(4H)-thione,
4-(1'-2'-dichloroethyl)-2-methoxy-1,3,4-thiadiazole-5(4H)-thione,
4-(1'-bromo-2'-chloroethyl)-2-methoxy-1,3,4-thiadiazole-5(4H)-thione.

The compounds of Formula I are suitable for the control of the most diverse animal and vegetable pests. The said compounds are particularly suitable for the control of insects and types belonging to the order acarina. These active substances have a good to very good action as contact and stomach poisons, combined with a systemic action against insects and their development stages, such as, e.g. against insects of the families Curcolionidae, Bruchididae, Dermistidae, Tenebrionidae and Chrysomelidae, e.g. grain weevils (*Sitophilus granarius*), common bean weevils (*Bruchidius obtectus*), larder beetles (*Dermestes vulpinus*), yellow mealworms (*Tenebrio molitor*), Colorado potato beetles (*Leptinotarsa decemlineata*); against insects of the family Pyralididae, e.g. Mediterranean flour moths (*Ephestia kühniella*); against insects of the family Blattidae, e.g. cockroaches (*Phyllodromia germanica, Periplaneta americana, Blatta orientalis*); against insects of the family Aphididae, e.g. bean Pseudococcidae, e.g. citrus mealybugs (*Planococcus citri*), and of the family Locustidae, e.g. migratory locusts (*Locusta migratoria*). Tests on the said bean aphids, citrus mealybugs and migratory locusts showed an excellent systemic action.

Furthermore the new organic phosphorus compounds of Formula I are suitable for the control of ecto- and endoparasitic insects occurring in animals, and of types of the order acarina and their development stages, such as insects of the family Muscidae, e.g. *Musca domestica* (house fly), *Stomoxys calcitrans* (stable fly); insects of the family Calliphoridae, e.g. *Calliphora erythrocephala* (blue blowfly), *Lucilia cuprina* (gold-fly), *Callitroga Tabanus bovinus* (gadfly); insects of the family Culicidae, e.g. Anopheles spp., Culex spp., Aedes spp. (mosquitoes); Arachnids of the family Argasidae, e.g. *Ornithodorus moubata* (soft tick), *Argas reflexus* (pigeon tick); Arachnids of the family Ixodidae, e.g. *Ixodes ricinus* (castor bean tick), of the family *Dermacentor reticulatus, Rhipicephalus bursa* and *Boophilus microplus* (ticks); Arachnids of the family Dermanyssidae, e.g. *Dermanyssus gallinae, Bdellonyssus bacoti,* of the family Demodicidae, e.g. *Demodex canis,* of the family Trombiculidae, e.g. *Trombicula autumnalis;* of the family Acaridae, e.g. *Acarus farinae* and siro; of the family Glycyphagidae, e.g. *Glycyphagus domesticus;* of the family Sarcoptidae, e.g. Sarcoptes spp. (mange mite) and of the family Psoroptidae, e.g. Psoroptes spp. (Mange mite).

In admixtures with synergists and similarly acting auxiliaries, such as dibutyl succinate, piperonyl butoxide, olive oil, peanut oil, etc., the range of action of the active substances according to the invention is broadened and, in particular, the insecticidal and acaricidal action improved. Likewise, the insecticidal action can be appreciably extended and adapted to suit existing circumstances by the addition of other insecticides, such as, e.g. phosphoric, phosphonic, thio- and dithiophosphoric acid esters and amides, halogenated hydrocarbons and analogs of DDT-active substances, as well as pyrethrines and synergists thereof, acaricidal active substances such as halogenobenzilic acid esters, insecticidal and acaricidal carbamates, e.g. oximecarbamates, arylcarbamates and carbamates of enolisable heterocycles.

In the concentrations used for the control of endoparasites, the active substances are not toxic, and are tolerated very well by domestic and useful animals.

The active substances of Formula I can be used on their own or together with suitable carriers and/or other additives. Suitable carriers and additives can be solid or liquid, and they correspond to the substances common in formulation practice.

Agents according to the invention are produced in a manner known per se by the intimate mixing and grinding of active substances of the general Formula I with suitable carriers, optionally with the addition of dispersing agents or solvents which are inert to the active substances. The active substances can be obtained and used in the following forms:

solid preparations:
    dusts, scattering agents, granulates, (coated granulates, impregnated granulates and homogeneous granulates);
liquid preparations:
    (a) water-dispersible concentrates of the active substance: wettable powders, pastes, emulsions;
    (b) solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminum silicates (feldspar and mica), calcium and magnesium sulphates, magnesium oxide, ground synthetic materials, fertilisers such as ammonium sulphate, ammonium phosphates, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm.; for scattering agents from about 0.075 mm. to 0.2 mm.; and for granulates 0.2 mm. or coarser.

The concentrations of active substance in the solid preparation forms are from 0.5 to 80%.

To these mixtures may also be added additives stabilising the active substance, and/or non-ionic, anion-active, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/lime mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, ligninsulphonic acids, their alkali metal and alkaline-earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80%.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, for example, silicones.

The active substances are so mixed, ground, sieved and strained with the above mentioned additives that the solid constitutent in the case of wettable powders has a particle size not exceeding 0.02 to 0.04 mm. and in the case of pastes not exceeding 0.03 mm. For the preparation of emulsion concentrates and pastes are used dispersing agents such as those mentioned in the preceeding paragraphs, organic solvents, and water. Suitable solvents are, e.g. the following: alcohols, benzene, xylenes, toluene, dimethylsulphoxide, and mineral oil fractions boiling in the range of 120 to 350°. The solvents must be practically odourless, non-phytotoxic, inert to the active substances, and not readily inflammable.

Furthermore, the agents according to the invention can be used in the form of solutions. For this purpose, the active substance (or several active substances) is (or are) dissolved in suitable organic solvents, mixtures of solvents, or water. As organic solvents it is possible to use aliphatic and aromatic hydrocarbons, their chlorinated derivatives, alkylnaphthalenes, mineral oils on their own or in admixture with each other. The solutions should contain the active substances in a concentration of from 1 to 20%.

To broaden their sphere of action, it is also possible to add to the described agents according to the invention, in addition to the insecticides and acaricides, e.g. fungicides, bactericides, fungistatics, bacteriostatics or nematocides. The agents according to the invention may also contain fertilisers, trace elements, etc.

The content of active substance in the above described agents is between 0.1 and 95%; it is to be mentioned that in the case of application from an aeroplane, or by means of other suitable application devices, concentrations of up to 99.5% are used, or even pure active substance is applied.

In the following are described preparations of the new active substances of the general Formula I. The term "parts" denotes parts by weight.

DUST

The following substances are used for the production of (a) a 5%, and (b) a 2% dust:

(a)

5 parts of the active substance of Formula I, e.g. O,O-dimethyl-S-[2-methoxy-1,3,4-thiadiazol - 5(4H) - onyl-(4)-isobutyryl(1')]-dithiophosphate,
95 parts of talcum;

(b)

2 parts of the active substance of Formula I, e.g. O,O-diethyl-S-[2 - methoxy - 1,3,4 - thiadiazol - 5(4H)-onyl(4)-isobutyryl(1')]-dithiophosphate,
1 part of highly dispersed silicic acid,
97 parts of talcum.

The active substances are mixed and ground with the carriers.

GRANULATE

The following substances are used for the preparation of a 5% granulate:

5 parts of O,O-dimethyl-S-[1,34-oxadiazol-5(4H)-onyl-(4)-ethyl(1')]-dithiophosphate,
0.5 parts of epoxidised vegetable oil,
2 parts of light silicic acid 50,
92.5 parts of ground limestone 0.4–0.8 mm.

The active substance is mixed with the epoxidised vegetable oil and the mixture dissolved with 6 parts of acetone. The thus obtained solution is sprayed on to crushed limestone, and the acetone then evaporated in vacuo. The light silicic acid is thereupon added.

WETTABLE POWDER

The following constituents are used for the preparation of (a) a 40%, (b) a 50%, (c) a 25%, and (d) a 10% wettable powder:

(a)

40 parts of O,O-diethyl-S-[2-methoxy-1,3,4-thiadiazol-5(4H)-onyl(4)-2'-chloroethyl-(1')]-dithiophosphate,
5 parts of sodium lignin sulphonate,
1 part of sodium dibutyl-naphthalene sulphonate,
54 parts of silicic acid;

(b)

50 parts of O,O-diethyl-S-[2 - methoxy-1,3,4-thiadiazol-5(4H)-onyl(4)-2'-chloroethyl-(1')]-dithiophosphate,
5 parts of alkylaryl sulphonate ("Tinovetin B"),
10 parts of calcium lignin sulphonate,
1 part of Champagne chalk/hydroxyethyl cellulose mixture (1:1),
20 parts of silicic acid,
14 parts of kaolin;

(c)

25 parts of O,O-diethyl-S-[2-ethoxy-1,3,4-thiadiazol-5-(4H)-onyl(4)-2'-chloroethyl-(1')]-dithiophosphate,
5 parts of sodium salt of ligninsulphonic acids, sulphite liquor powder, sodium salt,
1 part of alkylaryl sulphonate ("Tinovetin B"),
20 parts of Champagne chalk,
20 parts of sodium aluminium silicate,
29 parts of kaolin;

(d)

10 parts of O,O-diethyl-S-[2-isopropoxy-1,3,4-thiadiazol-5(44)-onyl(4)-2'-chloroethyl-(1')]-dithiophosphate,
3 parts of a mixture of the sodium salts of saturated fatty alcohol sulphates,
5 parts of naphthalenesulphonic acid/formaldehyde condensate,
82 parts of kaolin.

The active substances are intimately mixed, in suitable mixers, with the additives, the mixture then being ground in suitable mills and rollers. Wettable powders are obtained which can be diluted with water to obtain suspensions of any desired concentration.

EMULSIFIABLE CONCENTRATE

The following constituents are mixed together to produce a 25% emulsifiable concentrate:

25 parts of O,O-diethyl-S-[1,3,4-oxadiazol-5(4H)-onyl-(4)-ethyl(1')-diethiophosphate,
2.5 parts of epoxidised vegetable oil,
10 parts of a mixture of nonylphenolpolyoxyethylene and calcium-dodecylbenzene-sulphonate,
62.5 parts of xylene.

This concentrate can be diluted with water to obtain emulsions of any desired concentration.

EXAMPLE 1

To a mixture of 64 g. of pure concentrated sulphuric acid and 16 g. of ice are successively added, at room temperature, 40 g. of potassium salt of O,O-dimethyldithiophosphoric acid and 26 g. of 2-methoxy-1,3,4-thiadiazol-5(4H)-one. An amount of 12 g. of acetaldehyde is then slowly added dropwise at 30° whilst thorough stirring is maintained; the mixture is afterwards stirred for a further 3 hours at 30°. The mixture is then cooled to 0°, and 200 ml. of water are added dropwise with cooling. The precipitated oil is taken up in ether, the ether solution washed with sodium bicarbonate solution and with water, dried, and the ether distilled off. By molecular distillation at 140°/0.05 torr are obtained 54 g. of O,O-dimethyl-S-[-methoxy - 1,3,4-thiadiazol-5(4H)-onyl(4)-ethyl(1')]-dithiophosphate as pale yellow oil.

Calculated (percent): C, 26.57; H, 4.14; N, 8.86; P, 9.81; S, 30.41. Found: (percent) C, 26.51; H, 4.14; N, 9.09; P, 9.43; S, 30.11.

EXAMPLE 2

The same compound as in Example 1 is obtained also in the following manner:

(a) To a mixture of 26 g. of 2-methoxy-1,3,4-thiadiazol-5(4H)-one, 150 ml. of chloroform and 36 g. of thionyl chloride are added dropwise 20 g. of acetaldehyde, the temperature being thereby maintained between 20° and 30°. After several hours' stirring is obtained a pale yellow solution. The solution is heated to boiling and refluxed for one hour. After a fractionated distillation are obtained 30 g. of 2-methoxy-4-(1'-chloroethyl)-1,3,4-thiadiazol-5(4H)-one as pale yellow oil, B.P. 83–85°/0.5 torr.

(b) 35 g. of potassium salt of O,O-dimethyldithiophosphoric acid and 30 g. of 2-methoxy-4-(1'-chloroethyl)-1,3,4-thiadiazol-5(4H)-one are dissolved in 150 ml. of acetone. Stirring is carried out for 4 hours at 40°, and the acetone is distilled off in vacuo. Water is added to the residue, the precipitated oil is taken up in ether, the ether solution washed with sodium hydrogen carbonate solution and with water. After drying and distilling off the ether, molecular distillation is preformed in high vacuum. An amount of 15 g. of O,O-dimethyl-S-[2-methoxy-1,3,4-thiadiazol - 5(4H) - onyl(4) - ethyl(1')]-dithiophosphate passes over at 130°/0.07 torr.

EXAMPLE 3

To a mixture of 68 g. of pure concentrated sulphuric acid and 12 g. of ice are successively added, at room temperature, 46 g. of potassium salt of O,O-diethyldithiophosphoric acid and 26 g. of 2-methoxy-1,3,4-thiadiazol-5(4H)-one. An amount of 11 g. of paraldehyde is then slowly added dropwise, and the mixture is stirred for a further 3 hours at 35°. The mixture is cooled to 0° and, with cooling, 200 ml. of water are added dropwise. The product precipitates immediately in crystalline form. After recrystallisation from 70 ml. of methanol are obtained 36 g. of O,O - diethyl - S - 2-methoxy-1,3,4-thiadiazol-5(4H)-onyl(4)-ethyl(1')]-dithiophosphate in the form of colourless crystals, M.P. 53–55°.

Calculated (percent): C, 31.38; H, 4.98; N, 8.13; P, 9.01; S, 27.92. Found (percent): C, 31.41; H, 4.89; N, 8.18; P, 9.14; S, 27.99.

EXAMPLE 4

If the acetaldehyde in Example 1 is replaced by 15 g. of propionaldehyde, the procedure being otherwise the same, an oil is obtained, after the ether has been distilled off, which is caused to crystallise by trituration. After recrystallisation from 65 ml. of methanol are obtained 43 g. of O,O-dimethyl-S-[2-methoxy-1,3,4-thiadiazol-5(4H)-onyl(4)-propyl(1')]-dithiophosphate in the form of colourless crystals, M.P. 38°–40°.

Calculated (percent): C, 29.08; H, 4.58; N, 8.48; P, 9.40; S, 29.12. Found (percent): C, 29.46; H, 4.66; N, 8.88; P, 9.12; S, 28.94.

EXAMPLE 5

To a mixture of 60 g. of pure concentrated sulphuric acid and 20 g. of ice are successively added, at room temperature, 48 g. of potassium salt of O,O-diethyldithiophosphoric acid and 26 g. of 2-methoxy-1,3,4-thiadiazol-5(4H)-one. An amount of 17 g. of isobutyraldehyde is added dropwise at 30°–35°, with vigorous stirring, in the course of half an hour; stirring is then continued for a further 3 hours at 30°. The mixture is afterwards cooled to 0° and, with cooling, 200 ml. of water are added dropwise, The product crystallises out immediately. By recrystallisation from 350 ml. of methanol are obtained 61 g. of O,O-diethyl-S-[2-methoxy-1,3,4-thiadiazol-5(4H)-only(4) - isobutyl(1')]-dithiophosphate, M.P. 104°–105°.

Calculated (percent): C, 35,47; H, 5.69; N, 7.52; P, 8.33; S, 25.83. Found (percent): C, 35.42; H, 5.63; N, 7.46; P, 8.34; S, 25.69.

EXAMPLE 6

If the acetaldehyde in Example 1 is replaced by 22 g. of benzaldehyde, then is obtained using otherwise the same procedure, with the dropwise addition of water to the reaction mixture, an immediately crystallising product (see also Example 3). The product is filtered off and carefully dried. After recrystallisation from chloroform/petroleum ether are obtained 62 g. of O,O-dimethyl-S-[2-methoxy-1,3,4 - thiadiazol - 5(4H) - onyl(4) - benzyl]-dithiophosphate in the form of colourless crystals, M.P. 56°–58°.

Calculated (percent): C, 38.08; H, 4.00; N, 7.40; P, 8.20; S, 25.42. Found (percent): C, 37.80; H, 4.05; N, 7.31; P, 8.21; S, 25.71.

EXAMPLE 7

To a mixture of 64 g. of pure concentrated sulphuric acid and 16 g. of ice are successively added, at room temperature, 37 g. of ammonium salt of O,O-dimethyldithiophosphoric acid and 20 g. of 2-methyl-1,3,4-oxadiazol-5(4H)-one. An amount of 11 g. of metaldehyde is slowly added at 35° with vigorous stirring, and the mixture stirred for a further 3 hours at 35°. The mixture is then cooled to 0°, and to it are added dropwise, with cooling, 200 ml. of water. The product thereby crystallises out. After recrystallisation from 80 ml. of methanol are obtained 32 g. of O,O-dimethyl-S-[2-methyl-1,3,4-oxadiazol-5-(4H)-onyl(4)-ethyl-(1')-dithiophosphate in the form of colourless crystals, M.P. 65°–66°.

Calculated (percent): C, 29.57; H, 4.61; N, 9.85; P, 10.92; S, 22.55. Found (percent): C, 29.79; H, 4.43; N, 9.73; P. 10.87; S, 22.78.

EXAMPLE 8

To a mixture of 70 g. of pure concentrated sulphuric acid and 10 g. of ice are alternately added 42 g. of potassium salt of O,O-dimethyldithiophosphoric acid and 17 g. of 1,3,4-oxadiazol-5(4H)-one. An amount of 13 g. of propionaldehyde is then slowly added dropwise at 40°, whilst vigorous stirring is maintained; stirring is afterwards continued for a further 3 hours at 40°. The mixture is then cooled to 0°, and 200 ml. of water are added dropwise. The precipitated oil is taken up in ether, the ether solution washed with sodium bicarbonate solution and with water, dried, and the ether distilled off. The oil remaining behind gradually crystallises. By recrystallisation from 40 ml. of methanol are obtained 22 g. of O,O-dimethyl-S-[1,3,4-oxadiazol-5(4H)-onyl(4) - propyl(1')]-dithiophosphate in the form of colourless crystals, M.P. 51°–53°.

Calculated (percent): C, 29.57; H, 4.51; N, 9.85; P, 10.92; S, 22.55: Found (percent): C, 29.70; H, 4.60; N, 9.90; P, 10.90; S, 22.50.

EXAMPLE 9

In a mixture of 128 g. of pure concentrated sulphuric acid and 32 g. of ice are reacted at 30°, in the manner described in Example 1, 92 g. of potassium salt of O,O-diethyldithiophosphoric acid and 40 g. of 2-methyl-1,3,4-oxadiazol-5(4H)-one with 32 g. of isobutyraldehyde. The oil isolated by extraction with ether is subjected at 125°/0.02 torr to molecular distillation. The oil thereupon commences to crystallise. After recrystallisation from 100 ml. of methanol, an amount of 60 g. of O,O-diethyl-S-[2-methyl-1,3,4-oxadiazol-5(4H)-onyl(4)-isobutyl-(1')] - dithiophosphate is obtained in the form of colourless oil, M.P. 42°–43°.

Calculated (percent): C, 38.81; H, 6.22; N, 8.23; P, 9.12; S, 18.84. Found (percent): C, 38.70; H, 6.30; N, 8.20; P, 9.30; S, 18.80.

EXAMPLE 10

To 100 ml. of concentrated hydrochloric acid (ca. 37%) are added 40 g. of potassium salt of O,O-dimethyldithiophosphoric acid and 26 g. of 2-methoxy-1,3,4-thiadiazol-5(4H)-one. Hydrochloric acid gas is simultaneously fed in at 30°, and 60 g. of a 30% aqueous solution of chloroacetaldehyde are slowly added dropwise. The feeding in of hydrochloric acid gas continues and stirring is maintained for a further 3 hours at 30°; the mixture is thereupon poured into 150 ml. of water. The precipitated oil is taken up in ether, the ether solution washed with sodium bicarbonate solution and with water, dried, and the ether distilled off. The oil remaining behind is caused to crystallise by trituration. By recrystallisation from 60 ml. of methanol are obtained 43 g. of O,O-dimethyl-S-[2-methoxy-1,3,4-thiadiazol-5(4H)-onyl(4) - 2' - chloroethyl (1')]-dithiophosphate in the form of colourless crystals, M.P. 39°–40°.

Calculated (percent): C, 23.97; H, 3.45; N, 7.99; P, 8.85; S, 27.42; Cl, 10.11. Found (percent): C, 24.11; H, 3.53; N, 8.09; P, 8.76; S, 27.55; Cl, 10.44.

EXAMPLE 11

A product identical to that in Example 10 can be obtained also in the following manner:

To a mixture of 77 g. of pure concentrated sulphuric acid and 11 g. of ice are added, at room temperature, 42 g. of potassium salt of O,O-dimethyldithiophosphoric acid and 26 g. of 2-methoxy-1,3,4-thiadiazol-5(4H)-one. An amount of 25 g. of chloroacetaldehyde-dimethylacetal is then added dropwise at 40°, with vigorous stirring, in the course of half an hour. Stirring is continued for a further 3 hours at 40°; the mixture is then cooled to 0°, and 220 ml. of water are added dropwise. The further preparation as described in Example 10 yields 52 g. of O,O-dimethyl-S-[2-methoxy-1,3,4-thiadiazol-5(4H) - onyl (4)-2'-chloroethyl(1')]-dithiophosphate, M.P. 39°–40°.

EXAMPLE 12

(a) An amount of 26 g. of 2-methoxy-1,3,4-thiadiazol-5(4H)-one is suspended in 100 g. of a 30% aqueous solution of chloroacetaldehyde. The suspension is heated to 35°, 2 ml. of an aqueous 10% sodium carbonate solution are added, and stirring is continued for 24 hours at room temperature. Two liquid phases are formed. Extraction with ether is carried out, the ether solution dried, and concentrated in a water-jet vacuum. The oily intermediate product is dissolved in 50 ml. of chloroform, and to the solution are quickly added at 5° 60 g. of thionyl chloride. Stirring is carried out for one hour at room temperature, and for a further hour with refluxing. Readily volatile constituents are distilled off at 40° in a water-jet vacuum, and the residue is subsequently distilled in high vacuum. Thus obtained are 31 g. of 2-methoxy-4-(1', 2'-dichloroethyl)-1,2,4-thiadiazol-5(4H)-one as pale yellow oil, B.P. 89°–91°/0.03 torr.

(b) 26 g. of potassium salt of O,O-diethyldithiophosphoric acid and 24 g. of the 2-methoxy-4-(1',2'-dichloroethyl)-1,3,4-thiadiazol-5(4H)-one produced by the above described process are stirred in 100 ml. of acetone for 4 hours at 35° The acetone is distilled off in vacuo and to the oily residue are added 100 ml. of ice water; the residue is stirred until it solidifies in crystalline form. By recrystallisation from methanol are obtained 20 g. of O,O-diethyl-S-[2-methoxy-1,3,4-thiadiazol-5(4H)-onyl(4)-2' - chloroethyl(1')]-dithiophosphate, M.P. 50°–51°.

EXAMPLE 13

A compound identical to that given in Example 12 is obtained if the potassium salt of O,O-dimethyldithiosphosphoric acid in Example 11 is replaced by 46 g. of the potassium salt of O,O-diethyldithiophosphoric acid. With otherwise the same procedure are obtained 49 g. of O,O-diethyl-S-[2-methoxy-1,3,4-thiadiazol-5(4H)-onyl(4) - 2'-chloroethyl(1')]-dithiophosphate.

EXAMPLE 14

To 100 ml. of pure concentrated hydrochloric acid (d.=1.19) are successively added, at room temperature, 42 g. of potassium salt of O,O-dimethyldithiophosphoric acid and 29 g. of 2-ethoxy-1,3,4-thiadiazol-5(4H)-one. Hydrochloric acid gas is fed at 30° into the mixture being vigorously stirred, and simultaneously are added dropwise 60 g. of a 30% aqueous solution of chloroacetaldehyde. Stirring is maintained for a further 3 hours at 30° with the continued feeding in of hydrochloric acid gas. The mixture is then poured on to 150 g. of ice and the precipitated oil is taken up in ether; the ether solution is washed until free of acid, dried, and ether distilled off. The obtained oil crystallises and is recrystallised from methanol. Thus obtained are 48 g. of O,O-dimethyl-S-[2-ethoxy-1,3,4 - thiadiazol - 5(4H)-onyl(4)-2'-chloroethyl(1')]-dithiophosphate, M.P. 56°–58°.

Calculated (percent): C, 26.34; H, 3.88; N, 7.69; P, 8.51; S, 26.38; Cl, 9.72. Found (percent): C, 26.56, H, 3.86; N, 7.78; P, 8.44; S, 26.66; Cl. 9.80.

EXAMPLE 15

To a mixture of 114 g. of pure concentrated sulphuric acid and 16 g. of ice are added, at room temperature, 32 g. of 2-phenyl-1,3,4-oxadiazol-5(4H)-one and 42 g. of potassium salt of O,O-dimethyldithiophosphoric acid. An amount of 25 g. of chloroacetaldehyde-dimethylacetal is then slowly added dropwise at 40° whilst vigorous stirring is maintained; stirring is then continued for a further 3 hours at 40°. The mixture is thereupon cooled to 0°, and 250 ml. of water are added dropwise. The precipitated oil is processed by being taken up in ether in the usual manner. The residue is caused to crystallise by trituration. After recrystallisation from ethyl acetate/petroleum ether is obtained a product melting somewhat indefinitely at 68°–73°; the product consists mainly of O,O-dimethyl-S-[2 - phenyl - 1,3,4-oxadial-5(4H)-onyl(4)-2'-chloroethyl-(1')]-dithiophosphate.

Calculated (percent): C, 37.85; H, 3.70; N, 7.36; P, 8.16; S, 16.84; Cl, 9.31. Found (percent): C, 38.60; H, 3.76; N, 7.81; P, 7.75; S, 16.30; Cl, 9.01.

EXAMPLE 16

To a mixture of 77 g. of pure concentrated sulphuric acid and 11 g. of ice are added, at room temperature, 38 g. of ammonium salt of O,O-dimethyldithiophosphoric acid and 26 g. of 2-methoxy-1,3,4-thiadiazol-5(4H)-one. An amount of 34 g. of bromoacetaldehyde-dimethylacetal is then added dropwise at 40°, with vigorous stirring, in the course of half an hour. Stirring is continued for a further three hours at 40°; the reaction mixture is then cooled to 0°, and 220 ml. of water are added dropwise. The precipitated oil is taken up in ether, the ether solution washed with sodium bicarbonate solution and with water, dried, and the ether distilled off. The residue remaining is crystallised. After recrystallisation from 110 ml. of methanol are obtained 50 g. of O,O-dimethyl-S-[2 - methoxy - 1,3,4-thiadiazol-5(4H)-onyl(4)-2'-bromoethyl(1')]-dithiophosphate in the form of colourless crystals, M.P. 39°–41°.

Calculated (percent): C, 21.27; H, 3.06; N, 7.09; P, 7.86; S, 24.33; Br 20.22. Found (percent): C, 31.62; H, 3.11; N, 7.06; P, 7.86; S, 24.18; Br, 20.58.

EXAMPLE 17

If in Example 16 the ammonium salt of O,O-dimethyldithiophosphoric acid is replaced by 48 g. of potassium salt of O,O-diethyldithiophosphoric acid, then are obtained, with otherwise the same procedure, 53 g. of O,O-diethyl - S - [2-methoxy-1,3,4-thiadiazol-5(4H)-onyl(4)-2'-bromoethyl(1')]dithiophosphate, M.P. 45°–47°.

Calculated (percent): C, 25.53; H, 3.81; N, 6.62; P, 7.33; S, 22.72; Br, 18.88. Found (percent): C, 25.61; H, 3.75; N, 6.67; P, 7.23; S, 22.54; Br, 18.94.

EXAMPLE 18

To a mixture of 57 g. of pure concentrated sulphuric acid and 8 g. of ice are added 29 g. of ammonium salt of O,O-dimethyldithiophosphoric acid and 19.5 g. 2-methoxy-1,3,4-thiadiazol-5(4H)-one. An amount of 18 g. of methoxy-acetaldehyde-dimethylacetal is then added dropwise at 40°, with vigorous stirring, in the course of half an hour, and stirring is continued for a further 3 hours at 40°. The mixture is afterwards cooled to 0° and 160 ml. of water are added dropwise. The precipitated oil is taken up in ether, the ether solution washed with sodium bicarbonate solution and with water, and dried. The residue remaining after the ether has been distilled off crystallises. After recrystallisation from 45 ml. of methanol are obtained 29 g. of O,O-dimethyl-S-[2-methoxy - 1,3,4 - thiadiazol-5(4H)-onyl(4)-2'-methoxyethyl-(1')]-dithiophosphate in the form of colourless crystals, M.P. 36°–37°.

Calculated (percent): C, 27.74; H, 4.37; N, 8.09; P, 8.96; S, 27.77. Found (percent): C, 27.52; H, 4.41; N, 8.04; P, 8.98; S, 27.51.

EXAMPLE 19

An amount of 28 g. of methylthioacetaldehydedimethylacetal is added dropwise at 30°, with vigorous stirring and in the course of half an hour, to a mixture of 64 g. of pure concentrated sulphuric acid, 16 g. of ice, 42 g. of potassium salt of O,O-dimethyldithiophosphoric acid and 30 g. of 2-methylthio-1,3,4-thiadiazol-5(4H)-one. The reaction mixture is stirred for a further 3 hours at 30°; it is then cooled to 0° and 200 ml. of water are added dropwise. The precipitated oil is purified by extraction with ether and isolated, as in Example 18. It crystallises after the ether has been distilled off. By recrystallisation from 80 ml. of methanol, 55 g. of O,O-dimethyl - S - [2-methylthio - 1,3,4 - thiadiazol-5(4H)-onyl(4)-2'-methylthioethyl(1')]-dithiophosphate are obtained in the form of colourless crystals, M.P. 48°–49°.

Calculated (percent): C, 25.38; H, 4.00; N, 7.40; P, 8.20; S, 42.36. Found (percent): C, 25.40; H, 4.09; N, 7.53; P, 8.08; S, 42.09.

EXAMPLE 20

An amount of 30 g. of ethylthioacetaldehydedimethylacetal is added dropwise at 30°, with vigorous stirring and in the course of half an hour, to a mixture of 64 g. of pure concentrated sulphuric acid, 16 g. of ice, 42 g. of potassium salt of O,O-dimethyldithio phosphoric acid and 32 g. of 2-isopropoxy-1,3,4-thiadiazol-5(4H)-one. The reaction mixture is stirred for a further 3 hours at 30°, and the procedure then carried out analogously to that described in Example 18. The oil remaining after the ether has been distilled off is subjected to molecular distillation in high vacuum at 160°/0.025 torr. Thus obtained are 70 g. of O,O-dimethyl-S-[2-isopropoxy-1,3,4-thiadiazol - 5(4H) - onyl(4) - 2' - ethylthioethyl(1')]-dithiophosphate as pale yellow oil.

Calculated (percent): C, 32.66; H, 5.23; N, 6.92; P, 7.67; S, 31.71. Found (percent): C, 32.59; H, 5.43; N, 6.92; P, 7.60; S, 31.43.

EXAMPLE 21

An amount of 33 g. of isopropylthioacetaldehydedimethylacetal is added dropwise, analogously to Example 20, to a mixture of 64 g. of pure concentrated sulphuric acid, 16 g. of ice, 48 g. of potassium salt of O,O-diethyldithiophosphoric acid and 29 g. of 2-ethoxy-1,3,4-thiadiazol-5(4H)-one. Using the same procedure are obtained, by molecular distillation in high vacuum at 160°/0.02 torr, 73 g. of O,O-diethyl-S-[2-ethoxy-1,3,4-thiadiazol - 5(4H) - onyl(4) - 2' - isopropylthioethyl(1')]-dithiophosphate as pale yellow oil.

Calculated (percent): C, 36.09; H, 5.82; N, 6.48; P, 7.17; S, 29.65. Found (percent): C, 36.29; H, 5.90; N, 6.55; P, 6.81; S, 29.34.

EXAMPLE 22

To a mixture of 114 g. of pure concentrated sulphuric acid and 16 g. of ice are added, at room temperature, 42 g. of potassium salt of O,O-dimethyldithiophosphoric acid and 32 g. of 2-phenyl-1,3,4-oxadiazol-5(4H)-one. An amount of 28 g. of methylthioacetaldehyde-dimethylacetal is added dropwise to the above mixture at 40° in the course of half an hour with vigorous stirring. Stirring is carried out for a further three hours at 40°; the reaction mixture is then cooled to 10° and, with cooling, are added dropwise 250 ml. of water. The precipitated oil is isolated and purified by extraction with ether analogously to Example 18. The residue remaining after the ether has been distilled off crystallises. After recrystallisation from 70 ml. of methanol are obtained 44 g. of O,O-dimethyl - S - [2-phenyl - 1,3,4 - oxadiazol-5(4H)-onyl-(4)-2'-methylthioethyl(1')]-dithiophosphate in the form of colourless crystals, M.P. 56°–58°.

Calculated (percent): C, 39.78; H, 4.37; N, 7.14; P, 7.91; S, 24.51. Found (percent): C, 39.76; H, 4.24; N, 7.25; P, 7.73; S, 24.29.

EXAMPLE 23

An amount of 11 g. of acetaldehyde is added dropwise at 30°, with vigorous stirring and in the course of half an hour, to a mixture of 64 g. of pure concentrated sulphuric acid, 16 g. of ice, 38 g. of ammonium salt of O,O-dimethyldithiophosphoric acid and 30 g. of 2-methoxy - 1,3,4 - thiadiazole-5(4H)-thione. Stirring is continued for a further three hours at 30°; the mixture is then cooled to 0° and 200 ml. of water are added dropwise. The precipitated oil is isolated, analogously to Example 18, by extraction with ether. By molecular distillation at 150°/0.02 torr are obtained 43 g. of O,O-dimethyl - S - [2-methoxy-1,3,4-thiadiazole-5(4H)-thion-4-yl-ethyl(1′)]-dithiophosphate in the form of a pale yellow oil.

Calculated (percent): C, 25.29; H, 3.95; N, 8.43; P, 9.34; S, 38.58. Found (percent): C, 25.56; H, 3.97; N, 8.46; P, 9.16; S, 38.22.

EXAMPLE 24

An amount of 10 g. of metaldehyde is slowly added at 40°, with vigorous stirring, to a mixture of 114 g. of pure concentrated sulphuric acid, 16 g. of ice, 37 g. of ammonium salt of O,O-dimethyldithiophosphoric acid and 32 g. of 2-phenyl-1,3,4-oxadiazol-5(4H)-one. Stirring is continued for a further 3 hours at 40°. A crystalline product hereby precipitates. The mixture is then cooled to 0°; an amount of 250 ml. of water is carefully added dropwise, the solid material is filtered off and crystallised from 150 ml. of methanol. Thus obtained are 41 g. of O,O-dimethyl - S - [2-phenyl-1,3,4-oxadiazol-5(4H)-on-4-yl-ethyl-(1′)]-dithiophosphate, M.P. 75–77°.

Calculated (percent): C, 41.60; H, 4.37; N, 8.09; P, 8.96; S, 18.52. Found (percent): C, 41.34; H, 4.45; N, 8.23; P, 9.12; S, 18.68.

The analogously produced O,O-diethyl derivative melts at 62–64°.

EXAMPLE 25

To a mixture of 80 g. of pure concentrated sulphuric acid and 9 g. of ice are successively added, with slight cooling, 35 g. of ammonium salt of O,O-dimethylmonothiophosphoric acid and 26 g. of 2-methoxy-1,3,4-thiadiazol-5(4H)-one. An amount of 25 g. of chloroacetaldehyde-dimethylacetal is then slowly added dropwise at 40° with vigorous stirring; stirring is afterwards continued for a further 4 hours at 40°. The mixture is then cooled to 0° and to it are added dropwise, with good cooling, 240 ml. of water; the precipitated greasy residue is taken up in ether; a fine granular precipitate hereby obtained is then filtered off; the now clear ether solution washed with sodium bicarbonate solution and with water, dried, and the ether distilled off. The dark brown oil remaining behind is firstly cleared at 50°/0.05 torr of volatile constituents, and then subjected at 140°/0.005 torr to molecular distillation. Thus obtained are 15 g. of not quite pure O,O-dimethyl-S-[2-methoxy-1,3,4-thiadiazol-5(4H)-on-4-yl-(2′ - chloroethyl) - (1′)] - thiophosphate as a pale yellow oil. In the thin-layer chromatogram, a nonpolar impurity is visible as a secondary spot.

Calculated (percent): C, 25.12; H, 3.62; N, 8.37; P, 9.27; S, 19.15; Cl, 10.59. Found (percent): C, 26.30; H, 3.8; N, 9.1; P, 8.6; S, 19.2; Cl, 11.00.

Analogously to Examples 1 to 25 are produced the following compounds:

| Compounds | Melting point/ boiling point |
|---|---|
| O,O-dimethyl-S-[2-ethoxy-1,3,4-thiadiazol-5(4H)-onyl(4)-ethyl(1′)]-dithiophosphate | 44°–46° |
| O,O-diethyl-S-[2,ethoxy-1,3,4-thiadiazol-5(4H)-onyl-(4)-ethyl(1′)]-dithiophosphate | 145°/0.01 |
| O,O-dimethyl-S-[2-isopropoxy-1,3,4-thiadiazol-5(4H)-onyl(4)-ethyl(1′)-dithiophosphate | 48°–50° |
| O,O-diethyl-S-[2-isopropoxy-1,3,4-thiadiazol-5(4H)-onyl(4)-ethyl(1′)]-dithiophosphate | 150°/0.01 |
| O,O-dimethyl-S-[2-methylthio-1,3,4-thiadiazol-5(4H)-onyl-(4)-ethyl(1′)]-dithiophosphate | 42°–44° |
| O,O-diethyl-S-[2-methylthio-1,3,4-thiadiazol-5(4H)-onyl(4)-ethyl(1′)]-dithiophosphate | 42°–44° |
| O,O-dimethyl-S-[1,3,4-oxadiazol-5(4H)-onyl(4)-ethyl(1′)]-dithiophosphate | 125°/0.02 |
| O,O-diethyl-S-[1,3,4-oxadiazol-5(4H)-onyl(4)-ethyl(1′)]-dithiophosphate | 125°/0.02 |
| O,O-dimethyl-S-[2-methyl-1,3,4-thiadiazol-5(4H)-onyl(4)-ethyl(1′)]-dithiophosphate | 50°–51° |
| O,O-dimethyl-S-[2-methoxy-1,3,4-thiadiazol-5(4H)-onyl(4)-propyl(1′)]-dithiophosphate | 46°–48° |
| O,O-dimethyl-S-[2-methyl-1,3,4-oxadiazol-5(4H)-onyl(4)-propyl(1′)-di]thiophosphate | 71°–73° |
| O,O-diethyl-S-[2-methyl-1,3,4-oxadiazol-5(4H)-onyl(4)-propyl(1′)]-dithiophosphate | 130°/0.02 |
| O,O-dimethyl-S-[2-phenyl-1,3,4-oxadiazol-5(4H)-onyl(4)-propyl(1′)]-dithiophosphate | 58°–60° |
| O,O-diethyl-S-[2-phenyl-1,3,4-oxadiazol-5(4H)-onyl(4)-propyl(1′)-dithiophosphate | (¹) |
| O,O-dimethyl-S-[2-methoxy-1,3,4-thiadiazol-5(4H)-onyl(4)-isobutyl(1′)]-dithiophosphate | 56°–58° |
| O,O-dimethyl-S-[2-methyl-1,3,4-oxadiazol-5(4H)-onyl(4)-isobutyl(1′)]-dithiophosphate | 79°–81° |
| O,O-diethyl-S-[2-ethoxy-1,3,4-thiadiazol-5(4H)-onyl(4)-2′-chloroethyl(1′)-dithiophosphate | 145°/0.01 |
| O,O-dimethyl-S-[2-isopropoxy-1,3,4-thiadiazol-5(4H)-onyl-(4)-2′-chloroethyl(1′)]-dithiophosphate | 64°–66° |
| O,O-diethyl-S-[2-isopropoxy-1,3,4-thiadiazol-5(4H)-onyl(4)-2′-chloroethyl(1′)-dithiophosphate | 150°/0.01 |
| O,O-dimethyl-S-[2-methylthio-1,3,4-thiadiazol-5(4H)-onyl-(4)-2′-chloroethyl(1′)]-dithoiphosphate | 45°–46° |
| O,O-diethyl-S-[2-methylthio-1,3,4-thiadiazol-5(4H)-onyl(4)-2′-chloroethyl(1′)]-dithiophosphate | 145°/0.01 |
| O,O-diethyl-S-[2-phenyl-1,3,4-oxadiazol-5(4H)-onyl(4)-2′-chloroethyl(1′)]-dithiophosphate | (²) |
| O,O-dimethyl-S-[2-ethoxy-1,3,4-thiadiazol-5(4H)-onyl(4)-2′-bromoethyl(1′)]-dithiophosphate | 70°–71.5° |
| O,O-diethyl-S-[2-ethoxy-1,3,4-thiadiazol-5(4H)-onyl(4)-2′-bromoethyl(1′)]-dithiophosphate | 150°/0.01 |
| O,O-dimethyl-S-[2-methylthio-1,3,4-thiadiazol-5(4H)-onyl-(4)-2′-bromoethyl(1′)]-dithiophosphate | 150°/0.03 |
| O,O-diethyl-S-[2-methylthio-1,3,4-thiadiazol-5(4H)-onyl-2′-bromoethyl(1′)]-dithiophosphate | 160°/0.02 |
| O,O-dimethyl-S-[2-methoxy-1,3,4-thiadiazol-5(4H)-onyl(4)-2′-methylthio-ethyl(1′)]-dithiophosphate | 50°–52° |
| O,O-diethyl-S-[-2methoxy-1,3,4-thiadiazol-5(4H)-onyl(4)-2′-methylthio-ethyl(1′)]-dithiophosphate | 28°–30° |
| O,O-dimethyl-S-[2-ethoxy-1,3,4-thiadiazol-5(4H)-onyl(4)-2′-methylthio-ethyl(1′)-]dithiophosphate | 51°–52° |
| O,O-diethyl-S-[2-ethoxy-1,3,4-thiadiazol-5(4H)-onyl(4)-2′-methylthio-ethyl(1′)]-dithiophosphate | 155°/0.04 |
| O,O-dimethyl-S-[2-isopropoxy-1,3,4-thiadiazol-5(4H)-onyl(4)-2′-methylthio-ethyl(1′)]-dithiophosphate | 68°–69° |
| O,O-diethyl-S-[2-isopropoxy-1,3,4-thiadiazol-5(4H)-onyl(4)-2′-methylthio-ethyl(1′)]-dithiophosphate | 155°/0.05 |
| O,O-dimethyl-S-[2-methylthio-1,3,4-thiadiazol-5(4H)-onyl(4)-2′-methylthio-ethyl(1′)]-dithiophosphate | 155°/0.05 |
| O,O-diethyl-S-[2-methylthio-1,3,4-thiadiazol-5(4H)-onyl(4)-2′-methylthio-ethyl(1′)]-dithiophosphate | 160°/0.025 |
| O,O-diethyl-S-[2-phenyl-1,3,4-oxadiazol-5(4H)-onyl(4)-2′-methylthio-ethyl(1′)]-dithiophosphate | (³) |
| O,O-dimethyl-S-[2-methoxy-1,3,4-thiadiazol-5(4H)-onyl(4)-2′-ethylthio-ethyl(1′)]-dithiophosphate | 160°/0.04 |
| O,O-diethyl-S-[2-methoxy-1,3,4-thiadiazol-5(4H)-onyl(4)-2′-ethylthio-ethyl(1′)]-dithiophosphate | 160°/0.03 |
| O,O-dimethyl-S-[2-ethoxy-1,3,4-thiadiazol-5(4H)-onyl(4)-2′-ethylthio-ethyl(1′)]-dithiophosphate | 46°–47° |
| O,O-diethyl-S-[2-ethoxy-1,3,4-thiadiazol-5(4H)-onyl(4)-2′-ethylthio-ethyl(1′)]-dithiophosphate | 160°/0.01 |
| O,O-diethyl-S-[2-isopropoxy-1,3,4-thiadiazol-5(4H)-onyl(4)-2′-ethylthio-ethyl(1′)]-dithiophosphate | 160°/0.03 |
| O,O-dimethyl-S-[2-methoxy-1,3,4-thiadiazol-5(4H)-onyl(4)-2′-isopropylthio-ethyl(1′)]-dithiophosphate | 150°/0.02 |
| O,O-diethyl-S-[2-methoxy-1,3,4-thiadiazol-5(4H)-onyl(4)-2′-isopropylthio-ethyl(1′)]-dithiophosphate | 150°/0.02 |
| O,O-dimethyl-S-[2-ethoxy-1,3,4-thiadiazol-5(4H)-onyl(4)-2′-isopropylthio-ethyl(1′)]-dithiophosphate | 160°/0.01 |
| O,O-dimethyl-S-[2-isopropoxy-1,3,4-thiadiazol-5(4H)-onyl-(4)-2′-isopropylthio-ethyl(1′)]-dithiophosphate | 160°/0.03 |
| O,O-diethyl-S-[2-isopropoxy-1,3,4-thiadiazol-5(4H)-onyl(4)-2′-isopropylthio-ethyl(1′)]-dithiophosphate | 160°/0.03 |

¹ Calculated: C, 46.39; H, 5.45; N, 7.21; P, 7.99; S, 16.51. Found: C, 46.40; H, 5.60; N, 7.00; P, 8.00; S, 16.70.
² Calculated (percent): N, 6.85; P, 7.59; S, 15.96; Cl, 8.67. Found (percent): N, 6.30; P, 7.70; S, 16.00; Cl, 8.90.
³ Undistillable oil. Calculated (percent): N, 6.66; P, 7.38; S, 22.87. Found (percent): N, 6.00; P, 7.90; S, 22.70.

EXAMPLE 26

(a) Insecticidal contact-poison action (a₁) In order to test the active substances on polyvalent-resistant house flies (*Musca domestica*), on mosquitoes (*Aedes aegypti*) and on stable flies (*Stomoxys calcitrans*), coatings of the active substance were applied, using acetonic solutions of the active substance, in Petri dishes, whereby the following concentrations were used:

(a) 10 mg. of active substance per dish (for Musca),
(b) 1 mg. of active substance per dish (for Aedes),
(c) 1 mg. of active substance per square metre (for Stomoxys).

The test insects were placed in the dishes after one hour. The times are given in the following table after which all the insects were lying on their backs.

|  | House flies | Mosquitoes | Stable flies |
|---|---|---|---|
| O,O-diethyl-S-[2-ethoxy-1,3,4,-thiadiazol-5(4H)-on-4-yl-ethyl-(1')]-dithiophosphate | 5ʰ | 8ʰ | 30' |
| O,O-dimethyl-S-[2-methylthio-1,3,4-thiadiazol-5(4H)-on 4-yl-ethyl-(1')]-dithiophosphate | 8ʰ | 60' | 30' |
| O,O-dimethyl-S-[2-methoxy-1,3,4-thiadiazol-5(4H)-on-4-yl-(2'-chloroethyl)-(1')]-dithiophosphate | 4ʰ | 60' | 30' |
| O,O-diethyl-S-[2-methoxy-1,3,4-thiadiazol-5(4H)-on-4-yl-(2'-chloroethyl)-(1')]-dithiophosphate | 8ʰ | 5ʰ | 5' |
| O,O-dimethyl-S-[2-ethoxy-1,3,4-thiadiazol-5(4H)-on-4-yl-(2'-chloroethyl)-(1')]-dithiophosphate | 2ʰ | 5ʰ | 5ʰ |
| O,O-diethyl-S-[2-ethoxy-1,3,4-thiadiazol-5(4H)-on-4-yl-(2'-chloroethyl)-(1')]-dithiophosphate | 5ʰ | 5ʰ | 60' |
| O,O-dimethyl-S-[2-methoxy-1,3,4-thiadiazol-5(4H)-on-4-yl-(2'-bromoethyl)-(1')]-dithiophosphate | 24ʰ | 60' | 30' |
| O,O-dimethyl-S-[2-methoxy-1,3,4-thiadiazol-5(4H)-on-4-yl-(2'-methoxy-ethyl)(1')]-dithiophosphate | 5ʰ | 30' | 60' |
| O,O-diethyl-S-[2-methoxy-1,3,4-thiadiazol-5(4H)-on-4-yl-(2'-methylthioethyl)-(1')]-dithiophosphate | 8ʰ | 60' | 2ʰ |
| O,O-dimethyl-S-[2-methoxy-1,3,4-thiadiazol-5(4H)-on-4-yl-(2'-ethylthioethyl)-(1')]-dithiophosphate | 24ʰ | 2ʰ | 60' |
| O,O-dimethyl-S-[2-methoxy-1,3,4-thiadiazol-5(4H)-on-4-yl-(2'-isopropylthioethyl)-(1')]-dithiophosphate | 5ʰ | 5ʰ | 60' |
| O,O-dimethyl-S-[1,3,4-oxadiazol-5(4H)-on-4-yl-ethyl-(1')]-dithiophosphate | 30' | 10' | 10' |
| O,O-diethyl-S-[1,3,4-oxadiazol-5(4H)-on-4-yl-ethyl-(1')]-dithiophosphate | 60' | 30' | 10' |
| O,O-dimethyl-S-[2-methyl-1,3,4-oxadiazol-5(4H)-on-4-yl-ethyl-(1')]-dithiophosphate | 24ʰ | 30' | 10' |
| O,O-diethyl-S-[2-methyl-1,3,4-oxadiazol-5(4H)-on-4-yl-ethyl-(1')]-dithiophosphate | 2ʰ | 30' | 10' |
| O,O-dimethyl-S-[1,3,4-oxadiazol-5(4H)-on-4-yl-propyl-(1')]-dithiophosphate | 60' | 30' | 10' |
| O,O-dimethyl-S-[2-methyl-1,3,4-oxadiazol-5(4H)-on-4-yl-propyl-(1')]-dithiophosphate | 24ʰ | 30' | 10' |
| O,O-diethyl-S-[2-methyl-1,3,4-oxadiazol-5(4H)-on-4-yl-propyl-(1')]-dithiophosphate | 24ʰ | 60' | 10' |
| O,O-diethyl-S-[2-methyl-1,3,4-oxadiazol-5(4H)-on-4-yl-isobutyl-(1')]-dithiophosphate | 5ʰ | 60' | 30' |

(a₂) An amount of 20 mg. of a 1% dust was evenly distributed in Petri dishes; cockroaches (*Phyllodromia germanica* and *Periplaneta americana*) were then placed in the dishes and kept there under normal conditions at 22–24°.

In the following table are given the times after which all insects were lying on their backs.

|  | Minutes/hours |
|---|---|
| O,O-dimethyl-S-[2-methoxy-1,3,4-thiadiazol-5-(4H)-on-4-yl-(2'-chloroethyl)-(1')]dithiophosphate | 125' |
| O,O-dimethyl-S-[2-methoxy-1,3,4-thiadiazol-5-(4H)-on-4-yl-(2'-methoxy-ethyl)-(1')]-dithiophosphate | 140' |
| O,O-dimethyl-S-[1,3,4-oxadiazol-5(4H)-on-4-yl-ethyl-(1')]-dithiophosphate | 20' |
| O,O-diethyl-S-[1,3,4-oxadiazol-5(4H)-on-4-yl-ethyl-(1')]-dithiophosphate | 45' |
| O,O-dimethyl-S-[2-methyl-1,3,4-oxadiazol-5(4H)-on-4-yl-ethyl-(1')]-dithiophosphate | 110' |
| O,O-diethyl-S-[2-methyl-1,3,4-oxadiazol-5(4H)-on-4-yl-ethyl-(1')]-dithiophosphate | 3ʰ |
| O,O-dimethyl-S-[1,3,4-oxadiazol-5(4H)-on-4-yl-propyl-(1')]-dithiophosphate | 60' |
| O,O-dimethyl-S-[2-methyl-1,3,4-oxadiazol-5(4H)-on-4-yl-propyl-(1')]-dithiophosphate | 135' |

(a₃) Grain weevils were sprayed with 2 ml. of a 1% acetonic solution of active substance from a distance of 10 cm. with a sprayer. Immediately after the application, the insects were transferred to clean Petri dishes and kept there at 22°. In the following table are given the times after which all the insects were lying on their backs.

|  | Minutes/hours |
|---|---|
| O,O-dimethyl-S-[2-methylthio-1,3,4-thiadiazol-5(4H)-on-4-yl-ethyl-(1')]-dithiophosphate | 8ʰ |
| O,O-dimethyl-S-[2-methoxy-1,3,4-thiadiazol-5-(4H)-on-4-yl-(2'-chlorethyl)-(1')]-dithiophosphate | 3ʰ |
| O,O-diethyl-S-[2-methoxy-1,3,4-thiadiazol-5(4H)-on-4-yl-(2'-chloroethyl)-(1')]-dithiophosphate | 24ʰ |
| O,O-dimethyl-S-[2-ethoxy-1,3,4-thiadiazol-5(4H)-on-4-yl-(2'-chloroethyl)-(1')]-dithiophosphate | 8ʰ |
| O,O-diethyl-S-[2-ethoxy-1,3,4-thiadiazol-5(4H)-on-4-yl-(2'-cholorethyl)-(1')]-dithiophosphate | 8ʰ |
| O,O-dimethyl-S-[2-methoxy-1,3,4-thiadiazol-5(4H)-on-4-yl-(2'-methoxy-ethyl)-(1')]-dithiophospahte | 150' |
| O,O-diethyl-S-[2-methoxy-1,3,4-thiadiazol-5(4H)-on-4-yl-(2'-methylthio-ethyl)-(1')]-dithiophosphate | 5ʰ |
| O,O-dimethyl-S-[1,3,4-oxadiazol-5(4H)-on-4-yl-ethyl-(1')]-dithiophosphate | 42' |
| O,O-diethyl-S-[1,3,4-oxadiazol-5(4H)-on-4-yl-ethyl-(1')]-dithiophosphate | 70' |
| O,O-dimethyl-S-[2-methyl-1,3,4-oxadiazol-5(4H)-on-4-yl-ethyl-(1')]-dithiophosphate | 6ʰ |
| O,O-diethyl-S-[2-methyl-1,3,4-oxadiazol-5(4H)-on-4-yl-ethyl-(1')]-dithiophosphate | 24ʰ |
| O,O-dimethyl-S-[1,3,4-oxadiazol-5(4H)-on-4-yl-propyl-(1')]-dithiophosphate | 90' |
| O,O-diethyl-S-[2-methyl-1,3,4-oxadiazol-5(4H)-on-4-yl-propyl-(1')]-dithiophosphate | 5ʰ |

(b) Insecticidal lasting effect (b-a) On glass: Petri dishes containing coatings of active substance of 1 g. of active substance per square metre were allowed to stand for 7 days at 24°. Polyvalent houseflies, mosquitoes and stable flies were then placed onto the coatings.

(b-b) On wood: The active substances were applied from aqueous suspension to wooden boards, the concentration being 1 g. of active substance per square metre. The above stated test insects were placed after 8 days onto the treated boards.

In the following table is given the time in hours and minutes after which the insects were in the on-the-back position.

|  | House flies | Mosquitoes | Stable flies |
|---|---|---|---|
| On glass: |  |  |  |
| O,O-dimethyl-S-[2-methoxy-1,3,4-thiadiazol-5(4H)-thion 4-ethyl-(1')]-dithiophosphate | 5ʰ | 30' | 60' |
| O,O-dimethyl-S-[2-methoxy-1,3,4-thiadiazol-5(4H)-on-4-yl-(2'-bromo-ethyl)-(1')]-dithiophosphate | 5ʰ | 30' | 30' |
| O,O-dimethyl-S-[2-methoxy-1,3,4-thiadiazol-5(4H)-on-4-yl-(2'-methoxy-ethyl)-(1')]-dithiophosphate | 5ʰ | 60' | 2ʰ |
| On wood: |  |  |  |
| O,O-diethyl-S-[2-isopropyl-1,3,4-thiadiazol-5(4H)-on-4-yl-(2'-chlorethyl)-(1')]-dithiophosphate | 5ʰ | 5ʰ | 195' |
| O,O-dimethyl-S-[1,3,4-oxadiazol-5(4H)-on-4-yl-ethyl-(1')]-dithiophosphate | 5ʰ | 50' | 60' |
| O,O-diethyl-S-[1,3,4-oxadiazol-5(4H)-on-4-yl-ethyl-(1')]-dithiophosphate | 5ʰ | 48' | 53' |
| O,O-dimethyl-S-[2-methyl-1,3,4-oxadiazol-5(4H)-on-4-yl-ethyl-(1')]-dithiophosphate | 5ʰ | 55' | 240' |
| O,O-diethyl-S-[2-methyl-1,3,4-oxadiazol-5(4H)-on-4-yl-ethyl-(1')]-diethylphosphate | 5ʰ | 75' | 120' |
| O,O-dimethyl-S-[1,3,4-oxadiazol-5(4H)-on-4-yl-propyl-(1')]-dithiophosphate | 5ʰ | 50' | 110' |
| O,O-dimethyl-S-[2-methyl-1,3,4-oxadiazol-5(4H)-on-4-yl-propyl-(1')]-dithiophosphate | 5ʰ | 40' | 60' |
| O,O-diethyl-S-[2-methyl-1,3,4-oxadiazol-5(4H)-on-4-yl-propyl-(1')]-dithiophosphate | 4ʰ | 70' | 50' |
| O,O-diethyl-S-[2-methyl-1,3,4-oxadiazol-5(4H)-on-4-yl-isopropyl-(1')]-dithiophosphate | 5ʰ | 130' | 80' |

(c) Systemic-insecticidal action

In order to determine the systemic action, the soil of potted bean plants was watered per 600 cubic centimetres with 50 ml. of an aqueous emulsion containing 100 p.p.m. of active substance (emulsion obtained from a 10% emulsifiable concentrate).

After 3 days, aphis (aphis fabae) were placed onto the parts of the plants above the soil. The insects were protected by a special device from the contact and gas effect. The test was carried out at 24° and 70% relative humidity.

In the following table is given the time in days after which 100% of the insects were lying on their backs.

| | Days |
|---|---|
| O,O-dimethyl-S-[2-methoxy-1,3,4-thiadiazol-5(4H)-on-4-yl-(2'-methoxy-ethyl)-(1')]-dithiophosphate | 3 |
| O,O-diethyl-S-[2-methoxy-1,3,4-thiadiazol-5(4H)-on-4-yl-(2'-methylthio-ethyl)-(1')]-dithiophosphate | 2 |
| O,O-dimethyl-S-[1,3,4-oxadiazol-5(4H)-on-4-yl-ethyl-(1')]-dithiophosphate | 1 |
| O,O-diethyl-S-[1,3,4-oxadiazol-5(4H)-on-4-yl-ethyl-(1')]-dithiophosphate | 1 |
| O,O-dimethyl-S-[2-methyl-1,3,4-oxadiazol-5(4H)-on-4-yl-ethyl-(1')]-dithiophosphate | 3 |
| O,O-diethyl-S-[2-methyl-1,3,4-oxadiazol-5(4H)-on-4-yl-ethyl-(1')]-dithiophosphate | 5 |
| O,O-dimethyl-S-[1,3,4-oxadiazol-5(4H)-on-4-yl-propyl-(1')]-dithiophosphate | 1 |
| O,O-diethyl-S-[2-methyl-1,3,4-oxadiazol-5(4H)-on-4-yl-propyl-(1')]-dithiophosphate | 1 |
| O,O-dimethyl-S-[2-methyl-1,3,4-oxadiazol-5(4H)-on-4-yl-isobutyl-(1')]-dithiophosphate | 1 |
| O,O-diethyl-S-[2-methyl-1,3,4-oxadiazol-5(4H)-on-4-yl-isobutyl-(1')]-dithiophosphate | 1 |

(d) Insecticidal stomach poison effect

Potato plants were dipped in a 1% aqueous active substance emulsion (obtained from a 10% emulsifiable concentrate). After the coating had dried, Colorada beetle larvae (*Leptinotarsa decemlineata*) were placed on the plants.

In the following table is given the time in minutes and hours after which all the insects (100%) were lying on their backs.

| | Hours/min. |
|---|---|
| O,O-diethyl-S-[2-methoxy-1,3,4-thiadiazol-5(4H)-on-4-yl-(2'-chloroethyl)-(1')]-dithiophosphate | 95' |
| O,O-dimethyl-S-[2-ethoxy-1,3,4-thiadiazol-5(4H)-on-4-yl-(2'-chloroethyl)-(1')]-dithiophosphate | 2ʰ |
| O,O-diethyl-S-[2-ethoxy-1,3,4-thiadiazol-5(4H)-on-4-yl-(2'-chloroethyl)-(1')]-dithiophosphate | 2ʰ |
| O,O-dimethyl-S-[2-methylthio-1,3,4-thiadiazol-5(4H)-on-4-yl-(2'-chloroethyl)-(1')]-dithiophosphate | 2ʰ |
| O,O-diethyl-S-[2-methylthio-1,3,4-thiadiazol-5(4H)-on-4-yl-(2'-chloroethyl)-(1')]-dithiophosphate | 2ʰ |
| O,O-dimethyl-S-[2-methoxy-1,3,4-thiadiazol-5(4H)-on-4-yl-(2'-bromoethyl)-(1')]-dithiophosphate | 2ʰ |
| O,O-diethyl-S-[2-methoxy-1,3,4-thiadiazol-5(4H)-on-4-yl-(2'-bromoethyl)-(1')]-dithiophosphate | 2ʰ |
| O,O-dimethyl-S-[2-ethoxy-1,3,4-thiadiazol-5(4H)-on-4-yl-(2'-bromoethyl)-(1')]-dithiophosphate | 2ʰ |
| O,O-diethyl-S-[2-ethoxy-1,3,4-thiadiazol-5(4H)-on-4-yl-(2'-bromoethyl)-(1')]-dithiophosphate | 2ʰ |
| O,O-dimethyl-S-[2-methylthio-1,3,4-thiadiazol-5(4H)-on-4-yl-(2'-bromoethyl)-(1')]-dithiophosphate | 2ʰ |
| O,O-diethyl-S-[2-methylthio-1,3,4-thiadiazol-5(4H)-on-4-yl-(2'-bromoethyl)-(1')]-dithiophosphate | 3ʰ |
| O,O-dimethyl-S-[2-methoxy-1,3,4-thiadiazol-5(4H)-on-4-yl-(2'-methoxy-ethyl)-(1')]-dithiophosphate | 60' |
| O,O-diethyl-S-[2-ethoxy-1,3,4-thiadiazol-5(4H)-on-4-yl-(2'-methylthio-ethyl)-(1')]-dithiophosphate | 60' |
| O,O-diethyl-S-[2-methoxy-1,3,4-thiadiazol-5(4H)-on-4-yl-(2'-ethylthio-ethyl)-(1')]-dithiophosphate | 2ʰ |
| O,O-diethyl-S-[2-isopropoxy-1,3,4-thiadiazol-5(4H)-on-4-yl-(2'-ethylthio-ethyl)-(1')]-dithiophosphate | 5ʰ |
| O,O-diethyl-S-[2-ethoxy-1,3,4-thiadiazol-5(4H)-on-4-yl-(2'-isopropylthio-ethyl)-(1')]-dithiophosphate | 5ʰ |
| O,O-dimethyl-S-[2-isopropoxy-1,3,4-thiadiazol-5(4H)-on-4-yl-(2'-isopropylthio-ethyl)-(1')]-dithiophosphate | 3ʰ |
| O,O-diethyl-S-[2-isopropoxy-1,3,4-thiadiazol-5(4H)-on-4-yl-(2'-isopropylthio-ethyl)-(1')]-dithiophosphate | 3ʰ |
| O,O-diethyl-S-[1,3,4-oxadiazol-5(4H)-on-4-yl-ethyl-(1')]-dithiophosphate | 5ʰ |
| O,O-dimethyl-S-[2-methyl-1,3,4-oxadiazol-5(4H)-on-4-yl-ethyl-(1')]-dithiophosphate | 2ʰ |
| O,O-diethyl-S-[2-methyl-1,3,4-oxadiazol-5(4H)-on-4-yl-ethyl-(1')]-dithiophosphate | 2ʰ |
| O,O-diethyl-S-[2-phenyl-1,3,4-oxadiazol-5(4H)-on-4-yl-ethyl-(1')]-dithiophosphate | 5ʰ |
| O,O-diethyl-S-[2-methyl-1,3,4-oxadiazol-5(4H)-on-4-yl-propyl-(1')]-dithiophosphate | 5ʰ |
| O,O-diethyl-S-[2-phenyl-1,3,4-oxadiazol-5(4H)-on-4-yl-(2'-chloroethyl)-(1')]-dithiophosphate | 8ʰ |
| O,O-diethyl-S-[2-phenyl-1,3,4-oxadiazol-5(4H)-on-4-yl-(2'-methylthio-ethyl-)-(1')]-dithiophosphate | 3ʰ |

EXAMPLE 27—ACARICIDAL ACTION (a) Action on mites (*Tetranychus urticae*)

In order to test the acaricidal action, bean leaves infested by imagines, dormant stages and eggs of red spider mites (*Tetranychus urticae*) were treated with an aqueous emulsion containing the substance to be tested in a concentration of 0.1%. The mortality rate was determined after 6 days. Used as test insects were species of red spider mites resistant to commercial phosphorus esters.

| | Imagines | Dormant stage | Eggs |
|---|---|---|---|
| O,O-diethyl-S-[2-methoxy-1,3,4-thiadiazol-5(4H)-on-4-yl-propyl-(1')]-dithiophosphate | 100 | 50 | 100 |
| O,O-dimethyl-S-[2-methoxy-1,3,4-thiadiazol-5(4H)-on-yl-(2'-chloroethyl)-(1')]-dithiophosphate | 100 | 100 | 80 |
| O,O-diethyl-S-[2-methoxy-1,3,4-thiadiazol-5(4H)-on-4-yl-(2'-chloroethyl)-(1')]-dithiophosphate | 96 | 32 | 100 |
| O,O-diethyl-S-[2-methoxy-1,3,4-thiadiazol-5(4H)-on-4-yl-(2'-bromoethyl)-(1')]-dithiophosphate | 99 | 89 | 95 |
| O,O-diethyl-S-[2-isopropoxy-1,3,4-thiadiazol-5(4H)-on-4-yl-(2'-methylthioethyl)-(1')]-dithiophosphate | 70 | 85 | 80 |
| O,O-dimethyl-S-[2-methylthio-1,3,4-thiadiazol-5(4H)-on-4-yl-(2'-methylthioethyl)-(1')]-dithiophosphate | 70 | 80 | 0 |
| O,O-diethyl-S-[1,3,4-oxadiazol-5(4H)-on-4-yl-ethyl-(1')]-dithiophosphate | 98 | 94 | 0 |
| O,O-dimethyl-S-[1,3,4-oxadiazol-5(4H)-on-4-yl-propyl-(1')]-dithiophosphate | 98 | 95 | 0 |
| O,O-dimethyl-S-[2-methyl-1,3,4-oxadiazol-5(4H)-on-4-yl-propyl-(1')]-dithiophosphate | 100 | 100 | 100 |
| O,O-diethyl-S-[2-methyl-1,3,4-oxadiazol-5(4H)-on-4-yl-propyl-(1')]-dithiophosphate | 100 | 100 | 98 |
| O,O-diethyl-S-[2-methyl-1,3,4-oxadiazol-5(4H)-on-4-yl-isobutyl-(1')]-dithiophosphate | 100 | 100 | 95 |

(b) Action on ticks (*Boophilus microplus*)

In each case, 10 adult ticks ready for laying of various species were immersed for three minutes in an aqueous emulsion of the active substance in a concentration of 0.1%. The ticks were then kept at 27° and 80% relative humidity. A count was made on the 5th, 10th and 15th day of eggs laid.

*No eggs laid* with the following compounds:

O,O-diethyl-S-[2-methoxy-1,3,4-thiadiazol-5(4H)-on-4-yl-(2'-chloroethyl)-(1')]-dithiophosphate O,O-diethyl-S-[2-methoxy-1,3,4-thiadiazol-5(4H)-on-4-yl-(2'-methylthio-ethyl)-(1')]-dithiophosphate O,O-diethyl-S-[-2-ethoxy-1,3,4-thiadiazol-5(4H)-on-4-yl-(2'-methylthio-ethyl)-(1')]-dithiophosphate O,O-dimethyl-S-[2-isopropoxy-1,3,4-thiadiazol-5(4H)-on-4-yl-(2'-methylthio-ethyl)-(1')]-dithiophosphate O,O-diethyl-S-[2-isopropoxy-1,3,4-thiadiazol-5(4H)-on-4-yl-(2'-methylthio-ethyl)-(1')]-dithiophosphate O,O-diethyl-S-[2-methylthio-1,3,4-thiadiazol-5(4H)-on-4-yl-(2'-methylthio-ethyl)-(1')]-dithiophosphate O,O-dimethyl-S-[2-methoxy-1,3,4-thiadiazol-5(4H)-on-4-yl-(2'-ethylthio-ethyl-(1')]-dithiophosphate O,O-diethyl-S-[2-methoxy-1,3,4-thiadiazol-5(4H)-on-4-yl-(2'-ethylthio-ethyl-(1')]-dithiophosphate O,O-dimethyl-S-[2-methoxy-1,3,4-thiadiazol-5(4H)-on-4-yl-(2'-ethylthio-ethyl-(1')]-dithiophosphate O,O-diethyl-S-[2-methoxy-1,3,4-thiadiazol-5(4H)-on-4-yl-(2'-ethylthio-ethyl-(1')]-dithiophosphate O,O-dimethyl-S-[2-ethoxy-1,3,4-thiadiazol-5(4H)-on-4-yl-(2'-ethylthio-ethyl-(1')]-dithiophosphate O,O-diethyl-S-[2-ethoxy-1,3,4-thiadiazol-5(4H)-on-4-yl-(2'-ethylthio-ethyl-(1')]-dithiophosphate O,O-diethyl-S-[2-ethoxy-1,3,4-thiadiazol-5(4H)-on-4-yl-(2'-isopropylthio-ethyl)-(1')]-dithiophosphate O,O-dimethyl-S-[2-methylthio-1,3,4-thiadiazol-5(4H)-on-4-yl-(2'-chloroethyl)-(1')]-dithiophosphate O,O-diethyl-S-[2-ethoxy-1,3,4-thiadiazol-5(4H)-on-4-yl-(2'-bromoethyl-)-(1')]-dithiophosphate
O,O-diethyl-S-[1,3,4-oxadiazol-5(4H)-on-4-yl-ethyl-(1')]-dithiophosphate
O,O-diethyl-S-[2-methyl-1,3,4-oxadiazol-5(4H)-on-4-yl-propyl-(1')]-dithiophosphate
O,O-diethyl-S-[2-methyl-1,3,4-oxadiazol-5(4H)-on-4-yl-isobutyl-(1')]-dithiophosphate
O,O-diethyl-S-[2-phenyl-1,3,4-oxadiazol-5(4H)-on-4-yl-(2'-chloroethyl)-(1')]-dithiophosphate
O,O-dimethyl-S-[2-phenyl-1,3,4-oxadiazol-5(4H)-on-4-yl(2'-methylthio-ethyl)-(1')]-dithiophosphate
O,O-diethyl-S-[2-phenyl-1,3,4-oxadiazol-5(4H)-on-4-yl-(2'-methylthio-ethyl)-(1')]-dithiophosphate

What is claimed is:

1. Compounds of the formula:

$$\begin{array}{c} R_1 \\ R_2O \end{array} P \overset{X}{\underset{S-CH-N}{\diagdown}} \overset{Z}{\underset{R_3}{\underset{|}{\diagdown}}} \overset{Y=C}{\underset{N}{\diagdown}} C-R_4$$

wherein
$R_1$ represents lower alkyl, lower alkoxy or phenyl,
$R_2$ represents lower alkyl,
$R_3$ represents lower alkyl, chloro lower alkyl, bromo lower alkyl, lower alkoxyalkyl, lower alkylthioalkyl, phenyl,
$R_4$ represents hydrogen, lower alkyl, lower alkoxy, lower alkylthio, phenyl,
and the symbols X, Y and Z represent, independently of each other, oxygen or sulphur.

2. Compounds according to claim 1 of the formula:

$$\begin{array}{c} R_5O \\ R_6O \end{array} P \overset{X}{\underset{S-CH-N}{\diagdown}} \overset{Z}{\underset{R_7}{\underset{|}{\diagdown}}} \overset{Y=C}{\underset{N}{\diagdown}} C-R_8$$

wherein $R_5$ and $R_6$ each represent methyl or ethyl; $R_7$ represents methyl, ethyl, $C_3H_7(i)$, chloromethyl, bromomethyl, $-CH_2OCH_3$, $-CH_2SCH_3$, $-CH_2SC_2H_5$, $-CH_2SC_3H_7(i)$, or phenyl;
$R_8$ represents hydrogen, methyl, methoxy, ethoxy, isopropoxy, methylthio, or phenyl; and X, Y and Z each represent oxygen or sulphur.

3. Compound according to claim 2 of the formula:

$$\begin{array}{c} CH_3O \\ CH_3O \end{array} P \overset{S}{\underset{S-CH-N}{\diagdown}} \overset{S}{\underset{CH_3}{\underset{|}{\diagdown}}} \overset{O=C}{\underset{N}{\diagdown}} C-OCH_3$$

4. Compound according to claim 2 of the formula:

$$\begin{array}{c} C_2H_5O \\ C_2H_5O \end{array} P \overset{S}{\underset{S-CH-N}{\diagdown}} \overset{S}{\underset{CH_3}{\underset{|}{\diagdown}}} \overset{O=C}{\underset{N}{\diagdown}} C-OCH_3$$

5. Compound according to claim 2 of the formula:

$$\begin{array}{c} CH_3O \\ CH_3O \end{array} P \overset{S}{\underset{S-CH-N}{\diagdown}} \overset{S}{\underset{CH_3}{\underset{|}{\diagdown}}} \overset{O=C}{\underset{N}{\diagdown}} C-OC_2H_5$$

6. Compound according to claim 2 of the formula:

$$\begin{array}{c} C_2H_5O \\ C_2H_5O \end{array} P \overset{S}{\underset{S-CH-N}{\diagdown}} \overset{S}{\underset{CH_3}{\underset{|}{\diagdown}}} \overset{O=C}{\underset{N}{\diagdown}} C-OC_2H_5$$

7. Compound according to claim 2 of the formula:

$$\begin{array}{c} CH_3O \\ CH_3O \end{array} P \overset{S}{\underset{S-CH-N}{\diagdown}} \overset{S}{\underset{CH_3}{\underset{|}{\diagdown}}} \overset{O=C}{\underset{N}{\diagdown}} C-SCH_3$$

8. Compound according to claim 2 of the formula:

$$\begin{array}{c} C_2H_5O \\ C_2H_5O \end{array} P \overset{S}{\underset{S-CH-N}{\diagdown}} \overset{S}{\underset{CH_3}{\underset{|}{\diagdown}}} \overset{O=C}{\underset{N}{\diagdown}} C-SCH_3$$

9. Compound according to claim 2 of the formula:

$$\begin{array}{c} CH_3O \\ CH_3O \end{array} P \overset{S}{\underset{S-CH-N}{\diagdown}} \overset{S=C}{\underset{CH_3}{\underset{|}{\diagdown}}} \overset{}{\underset{N}{\diagdown}} C-OCH_3$$

10. Compound according to claim 2 of the formula:

$$\begin{array}{c} CH_3O \\ CH_3O \end{array} P \overset{S}{\underset{S-CH-N}{\diagdown}} \overset{O}{\underset{CH_3}{\underset{|}{\diagdown}}} \overset{O=C}{\underset{N}{\diagdown}} CH$$

11. Compound according to claim 2 of the formula:

$$\begin{array}{c} C_2H_5O \\ C_2H_5O \end{array} P \overset{S}{\underset{S-CH-N}{\diagdown}} \overset{O}{\underset{CH_3}{\underset{|}{\diagdown}}} \overset{O=C}{\underset{N}{\diagdown}} CH$$

12. Compound according to claim 2 of the formula:

$$\begin{array}{c} CH_3O \\ CH_3O \end{array} P \overset{S}{\underset{S-CH-N}{\diagdown}} \overset{O}{\underset{CH_3}{\underset{|}{\diagdown}}} \overset{O=C}{\underset{N}{\diagdown}} C-CH_3$$

13. Compound according to claim 2 of the formula:

$$\begin{array}{c} C_2H_5O \\ C_2H_5O \end{array} P \overset{S}{\underset{S-CH-N}{\diagdown}} \overset{O}{\underset{CH_3}{\underset{|}{\diagdown}}} \overset{O=C}{\underset{N}{\diagdown}} C-CH_3$$

14. Compound according to claim 2 of the formula:

$$\begin{array}{c} CH_3O \\ CH_3O \end{array} P \overset{S}{\underset{S-CH-H}{\diagdown}} \overset{O}{\underset{C_2H_5}{\underset{|}{\diagdown}}} \overset{O=C}{\underset{N}{\diagdown}} CH$$

15. Compound according to claim 2 of the formula:

$$\begin{array}{c} CH_3O \\ CH_3O \end{array} P \overset{S}{\underset{S-CH-N}{\diagdown}} \overset{O}{\underset{C_2H_5}{\underset{|}{\diagdown}}} \overset{O=C}{\underset{N}{\diagdown}} C-CH_3$$

16. Compound according to claim 2 of the formula:

$$\begin{array}{c} C_2H_5O \\ C_2H_5O \end{array} P \overset{S}{\underset{S-CH-N}{\diagdown}} \overset{O}{\underset{C_2H_5}{\underset{|}{\diagdown}}} \overset{O=C}{\underset{N}{\diagdown}} C-CH_3$$

17. Compound according to claim 2 of the formula:

$$\begin{array}{c} CH_3O \\ CH_3O \end{array} P \overset{S}{\underset{S-CH-N}{\diagdown}} \overset{O}{\underset{C_3H_7(i)}{\underset{|}{\diagdown}}} \overset{O=C}{\underset{N}{\diagdown}} C-CH_3$$

18. Compound according to claim 2 of the formula:
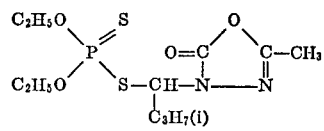

19. Compound according to claim 2 of the formula:
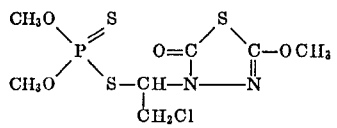

20. Compound according to claim 2 of the formula:
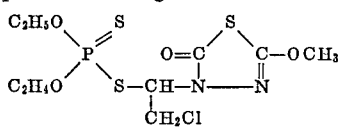

21. Compound according to claim 2 of the formula:
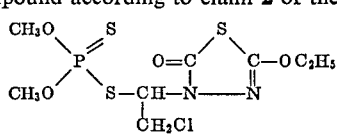

22. Compound according to claim 2 of the formula:
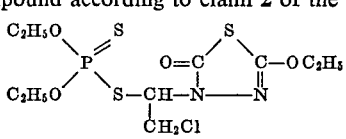

23. Compound according to claim 2 of the formula:
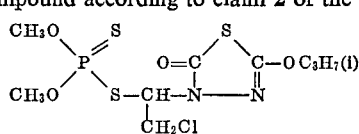

24. Compound according to claim 2 of the formula:
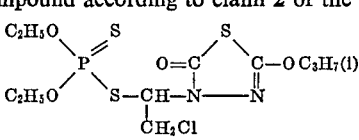

25. Compound according to claim 2 of the formula:
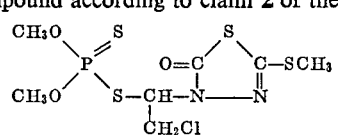

26. Compound according to claim 2 of the formula:
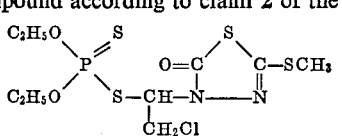

27. Compound according to claim 2 of the formula:
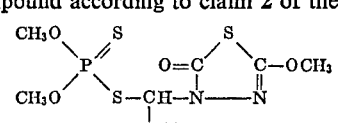

28. Compound according to claim 2 of the formula:
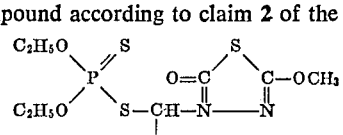

29. Compound according to claim 2 of the formula:
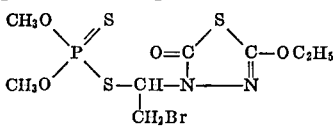

30. Compound according to claim 2 of the formula:
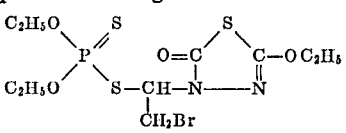

31. Compound according to claim 2 of the formula:
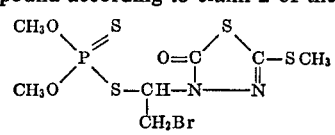

32. Compound according to claim 2 of the formula:
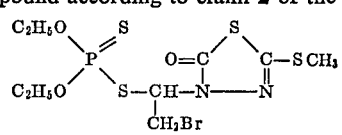

33. Compound according to claim 2 of the formula:
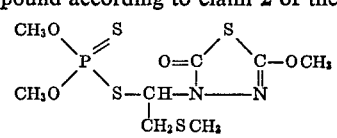

34. Compound according to claim 2 of the formula:
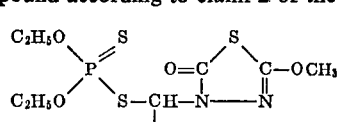

35. Compound according to claim 2 of the formula:
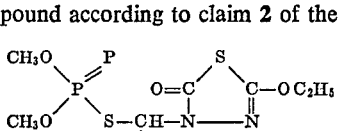

36. Compound according to claim 2 of the formula:
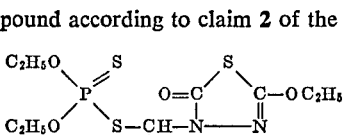

37. Compound according to claim 2 of the formula:
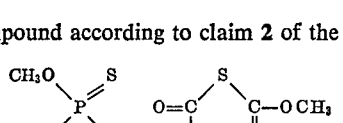

References Cited
UNITED STATES PATENTS
2,706,194   4/1955   Morris et al. _____ 260—302 E
3,239,532   3/1966   Rufenacht _____ 260—302 E RICHARD J. GALLAGHER, Primary Examiner U.S. Cl. X.R.

260—302 D, 307 A; 424—200

UNITED STATES PATENT OFFICE
CERTIFICATE OF CORRECTION

Patent No. 3,766,200  Dated October 16, 1973

Inventor(s) Kurt Rüfenacht

It is certified that error appears in the above-identified patent and that said Letters Patent are hereby corrected as shown below:

The following should be inserted in the heading:

Claims priority, application Switzerland

July 2, 1970, No. 10042/70

Signed and sealed this 16th day of July 1974.

(SEAL)
Attest:

McCOY M. GIBSON, JR.
Attesting Officer

C. MARSHALL DANN
Commissioner of Patents